US009356824B1

(12) United States Patent
Khanal

(10) Patent No.: US 9,356,824 B1
(45) Date of Patent: May 31, 2016

(54) TRANSPARENTLY CACHED NETWORK RESOURCES

(75) Inventor: Bhushan P. Khanal, Seattle, WA (US)

(73) Assignee: F5 Networks, Inc., Seattle, WA (US)

( * ) Notice: Subject to any disclaimer, the term of this patent is extended or adjusted under 35 U.S.C. 154(b) by 1507 days.

(21) Appl. No.: 11/537,474

(22) Filed: Sep. 29, 2006

(51) Int. Cl.
*G06F 15/16* (2006.01)
*H04L 29/12* (2006.01)

(52) U.S. Cl.
CPC ..... *H04L 29/12047* (2013.01); *H04L 29/12009* (2013.01)

(58) Field of Classification Search
CPC .............. H04L 29/12047; H04L 29/12009
USPC .......................................................... 709/201
See application file for complete search history.

(56) References Cited

U.S. PATENT DOCUMENTS

| | | | |
|---|---|---|---|
| 4,021,782 A | 5/1977 | Hoerning |
| 4,054,951 A | 10/1977 | Jackson et al. |
| 4,316,222 A | 2/1982 | Subramaniam |
| 4,386,416 A | 5/1983 | Giltner et al. |
| 4,593,324 A | 6/1986 | Ohkubo et al. |
| 4,626,829 A | 12/1986 | Hauck |
| 4,701,745 A | 10/1987 | Waterworth |
| 4,862,167 A | 8/1989 | Copeland, III |
| 4,876,541 A | 10/1989 | Storer |
| 4,890,282 A | 12/1989 | Lambert et al. |
| 4,897,717 A | 1/1990 | Hamilton et al. |
| 4,906,991 A | 3/1990 | Fiala et al. |
| 4,971,407 A | 11/1990 | Hoffman |
| 4,988,998 A | 1/1991 | O—Brien |
| 5,003,307 A | 3/1991 | Whiting et al. |
| 5,016,009 A | 5/1991 | Whiting et al. |
| 5,109,433 A | 4/1992 | Notenboom |
| 5,126,739 A | 6/1992 | Whiting et al. |
| 5,146,221 A | 9/1992 | Whiting et al. |
| 5,150,430 A | 9/1992 | Chu |
| 5,155,484 A | 10/1992 | Chambers, IV |
| 5,167,034 A | 11/1992 | MacLean, Jr. et al. |
| 5,212,742 A | 5/1993 | Normile et al. |
| 5,249,053 A | 9/1993 | Jain |
| 5,280,600 A | 1/1994 | Van Maren et al. |
| 5,293,388 A | 3/1994 | Monroe et al. |

(Continued)

OTHER PUBLICATIONS

RFC 793, "Transmission Control Protocol Darpa Internet Program Protocol Specification," Information Sciences Institute, University of Southern California, Sep. 1981, pp. 1-60, www.faqs.org/rfcs/rfc793.html.

(Continued)

*Primary Examiner* — June Sison
*Assistant Examiner* — Adam Cooney
(74) *Attorney, Agent, or Firm* — John W. Branch; Lowe Graham Jones PLLC

(57) ABSTRACT

A method, system, and apparatus are directed towards managing content over a network. A request from a requestor for a resource is received over the network. The request may include a request for resource identified by a Network Resource Identifier (NRI). The request may also include Systems Interconnection (OSI) level 2-7 data. Characteristics of the requestor are determined based on the request. The characteristics are mapped onto a label. A unique key is generated based on the request, the characteristics, and/or the label. A version of the resource to cache is determined based on the request, the characteristics, the label, and/or the unique key. The version of the resource is cached based on the unique key.

27 Claims, 5 Drawing Sheets

(56) References Cited

U.S. PATENT DOCUMENTS

| | | | |
|---|---|---|---|
| 5,341,440 A | 8/1994 | Earl et al. | |
| 5,367,629 A | 11/1994 | Chu et al. | |
| 5,379,036 A | 1/1995 | Storer | |
| 5,410,671 A | 4/1995 | Elgamal et al. | |
| 5,414,425 A | 5/1995 | Whiting et al. | |
| 5,463,390 A | 10/1995 | Whiting et al. | |
| 5,479,587 A | 12/1995 | Campbell et al. | |
| 5,488,364 A | 1/1996 | Cole | |
| 5,504,842 A | 4/1996 | Gentile | |
| 5,506,944 A | 4/1996 | Gentile | |
| 5,539,865 A | 7/1996 | Gentile | |
| 5,542,031 A | 7/1996 | Douglass et al. | |
| 5,544,290 A | 8/1996 | Gentile | |
| 5,546,395 A | 8/1996 | Sharma et al. | |
| 5,546,475 A | 8/1996 | Bolle et al. | |
| 5,553,160 A | 9/1996 | Dawson | |
| 5,615,287 A | 3/1997 | Fu et al. | |
| 5,638,498 A | 6/1997 | Tyler et al. | |
| 5,768,445 A | 6/1998 | Troeller et al. | |
| 5,768,525 A | 6/1998 | Kralowetz et al. | |
| 5,774,715 A | 6/1998 | Madany et al. | |
| 5,805,932 A | 9/1998 | Kawashima et al. | |
| 5,892,847 A | 4/1999 | Johnson | |
| 5,951,623 A | 9/1999 | Reynar et al. | |
| 6,532,481 B1 * | 3/2003 | Fassett, Jr. | 707/203 |
| 6,546,423 B1 | 4/2003 | Dutta et al. | |
| 6,772,225 B1 * | 8/2004 | Jennings, III et al. | 709/240 |
| 7,102,996 B1 | 9/2006 | Amdahl et al. | |
| 7,571,217 B1 | 8/2009 | Saxena | |
| 8,352,570 B2 | 1/2013 | Saxena | |
| 2003/0004998 A1 * | 1/2003 | Datta | 707/513 |
| 2003/0023578 A1 * | 1/2003 | Durand et al. | 707/1 |
| 2003/0200283 A1 * | 10/2003 | Suryanarayana et al. | 709/219 |
| 2005/0114445 A1 * | 5/2005 | Tracton et al. | 709/203 |
| 2006/0015637 A1 * | 1/2006 | Chung | 709/232 |
| 2006/0265689 A1 | 11/2006 | Kuznetsov et al. | |
| 2007/0104326 A1 * | 5/2007 | Feigenbaum et al. | 380/44 |

OTHER PUBLICATIONS

RFC 2326, "Real Time Streaming Protocol (RTSP)," The Internet Society, Apr. 1998, pp. 1-76, www.ietf.org/rfc/rfc2326.txt.
RFC 2616, "Hypertext Transfer Protocol—HTTP/1.1," The Internet Society, Jun. 1999, pp. 1-124, www.faqs.org/rics/rfc2616.html.
RFC 3550, "RTP: A Transport Protocol for Real-Time Applications," The Internet Society, Jul. 2003, pp. 1-86, www.ietf.org.rfc/rfc3550.txt.
RFC 3986, "Uniform Resource Identifier (URI): Generic Syntax," The Internet Society, Jan. 2005, pp. 1-51, www.ietf.org/rfc/rfc3986.txt.
Cheng, J.M., et al. "A fast, highly reliable data compression chip and algorithm for storage systems," IBM, vol. 40, No. 6, Nov. 1996, 11 pgs.
Simpson, W. "The Point-To-Point Protocol (PPP)," RFC 1661, Jul. 1994, 54 pgs.
Schneider, K., et al. "PPP for Data Compression in Data Circuit-Terminating Equipment (DCE)," RFC 1976, Aug. 1996, 10 pgs.
Castineyra, I., et al. "The Nimrod Routing Architecture," RFC 1992, Aug. 1996, 27 pgs.
Degermark, Mikael et al., "Low-Loss TCP/IP Header Compression for Wireless Networks," J.C. Baltzar AG, Science Publishers, Oct. 1997, pp. 375-387.
"Direct Access Storage Device Compression and Decompression Data Flow," IBM Technical Disclosure Bulletin, vol. 38, No. 11, Nov. 1995, pp. 291-295.
"Drive Image Professional for DOS, OS/2, and Windows," WSDC Dowload Guide, http://wsdcds01.watson.ibm.com/WSDC.nsf/Guides/Download/Applications-DriveImage.htm, accessed Nov. 22, 1999, 4 pgs.
"Drive Image Professional," WSDC Download Guide, http://wsdcds01.watson.ibm.com/wsdc.nsf/Guides/Download/Applications-DriveImage.htm, accessed May 3, 2001, 5 pgs.
Electronic Engineering Times, Issue 759, Aug. 16, 1993, 37 pgs.
Adaptive Lossless Data Compression—ALDC, IBM, Jun. 15, 1994, 2 pgs.
ALDC1-5S—Adaptive Lossless Data Compression, IBM Microelectronics, May 1994. 2 pgs.
ALDC1-20S—Adaptive Lossless Data Compression, IBM Microelectronics, May 1994, 2 pgs.
ALDC1-40S—Adaptive Lossless Data Compression, IBM Microelectronics, May 1994, 2 pgs.
ALDC-Macro—Adaptive Lossless Data Compression, IBM Microelectronics, May 1994, 2 pgs.
Craft, David J., "Data Compression Choice No Easy Call," Computer Technology Review, Jan. 1994, 2 pgs.
"Data Compression Applications and Innovations Workshop," Proceedings of a Workshop held in conjunction with the IEEE Data Compression Conference, Mar. 31, 1995, 123 pgs.
IBM Microelectronics Comdex Fall 1993 Booth Location, 1 pg.
"IBM Technology Products Introduces New Family of High-Performance Data Compression Products," IBM Corporation, Somers, NY, Aug. 16, 1993, 6 pgs.
Costlow, Terry "Sony designs faster, denser tape drive," Electronic Engineering Times, May 20, 1996, 2 pgs.
Electronic Engineering Times, Issue 767, Oct. 11, 1993, 34 pgs.
"IBM Announces New Feature for 3480 Subsystem," Tucson Today, vol. 12, No. 337, Jul. 25, 1989, 1 pg.
Craft, D.J. "A fast hardware data compression algorithm and some algorithmic extensions," IBM Journal of Research and Development, vol. 42, No. 6, Nov. 1998, 14 pgs.
"Magstar and IBM 3590 High Performance Tape Subsystem Technical Guide," IBM, Nov. 1996, 287 pgs.
Zebrose, Katherine L., "Integrating Hardware Accelerators into Internetworking Switches," Telco Systems, Nov. 1993, 10 pages.
"Readme," Powerquest Corporation, 1994-1999, 6 pages.
"PowerQuest Drive Image(R) Pro, Version 3.00," PowerQuest Corporation, 1994-1999, 6 pages.

\* cited by examiner

TRANSPARENTLY CACHED NETWORK RESOURCES

TECHNICAL FIELD

The present invention relates generally to network communications, and more particularly, but not exclusively, to managing content over a network.

BACKGROUND

Users on the Internet require speed and reliability when requesting content from web servers. The web servers may have a delay in providing content or may intermittently fail to provide content because of technical problems. Web proxies can cache content sent to clients with the goal of enabling subsequent requests to be handled more quickly or reliably. Web proxies can cache a copy of content for a requested Uniform Resource Identifier (LTRI), Uniform Resource Locator (URL), Uniform Resource Name (URN), or other link that identifies the content, and can provide the cached copy in subsequent requests for the same link.

To request content, users typically employ a variety of types of client devices with different characteristics and capabilities, including a client computer, a mobile device, or the like. These client devices may request the same content differently and a number of different conditions (e.g. network state) may affect content delivery to these clients. Still other factors may affect content delivery, such as differences in client connection speed, a client's browser capability or the like. Additionally, some client devices may be unable to display or otherwise receive content in a particular format. Moreover, some users of client devices may be restricted from accessing particular content based on security policies, or the like.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION

Figure 1:
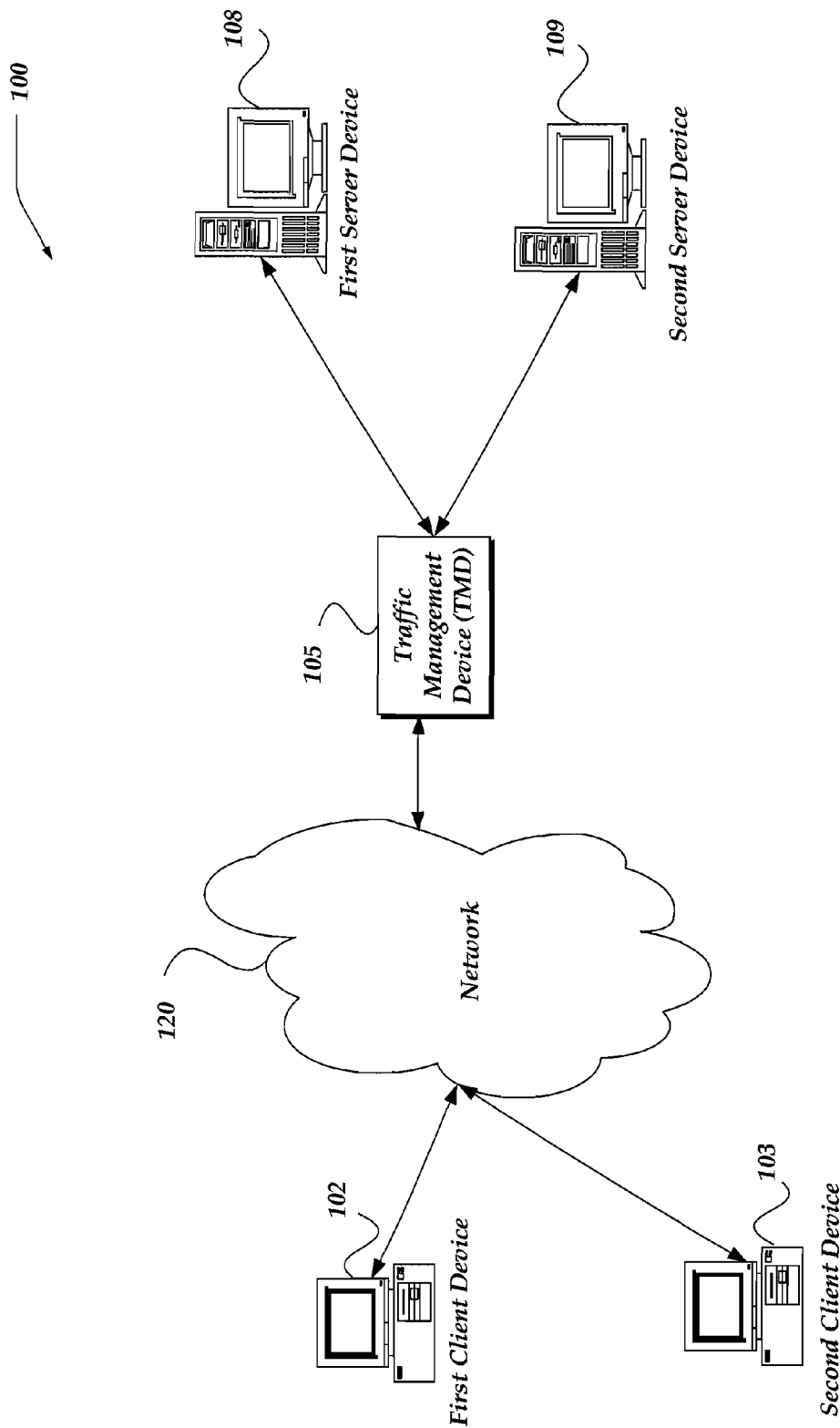
FIG. 1 shows a block diagram illustrating an environment for practicing the invention.

The invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the invention may be embodied as methods or devices. Accordingly, the invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The term "network connection" refers to a collection of links and/or software elements that enable a computing device to communicate with another computing device over a network. One such network connection may be a TCP connection. TCP connections are virtual connections between two network nodes, and are typically established through a TCP handshake protocol. The TCP protocol is described in more detail in Request for Comments (RFC) 793, which is available through the Internet Engineering Task Force (IETF). A network connection "over" a particular path or link refers to a network connection that employs the specified path or link to establish and/or maintain a communication. The term "node" refers to a network element that typically interconnects one or more devices, or even networks.

As used herein, the term "Uniform Resource Identifier (URI)" refers to any network resource identifier including a Uniform Resource Locator (URL), or a Uniform Resource Name (URN). URIs are described in more detail in RFC 3986, which is available through the IETF, and incorporated herein by reference.

As used herein, the terms "request" and "content" refer to any data capable of being transmitted over a network. The term "requestor" refers to any device capable of sending a request for a resource over a network. The term requestee refers to any device capable of providing the resource in response to the request.

Briefly, the embodiments of the invention are directed towards systems, computer readable media, and methods for managing content over a network. A request from a requestor for a resource is received over the network. The request may include a request for the resource identified by a network resource identifier (NRI). The request may include Systems Interconnection (OSI) level 2-7 data. The NRI includes virtually any alphanumeric string for identifying a network resource applicable to at least one of the OSI 2-7 layers. In one embodiment, the NRI includes a URI or any other type of unique network resource identifier. The request may include transport protocol header information, including Hypertext Transfer Protocol (HTTP) header information, Real Time Stream Protocol (RTSP) header information, or any of a variety of other header information protocol types. HTTP header information is described in more detail in RFC 2616, which is available through the IETF, which is incorporated herein by reference. RTSP header information is described in more detail in RFCs 2326 and 3550, which are available through the IETF, which are incorporated herein by reference.

Characteristics of the requestor are determined based on the request. As used herein, the term "characteristics of a request" refers to any characteristics associated with the request, including characteristics of the client sending the request, of a user of the client sending the request, of the information included in the request, of network metrics associated with sending the request, of the network connection for transmitting the request, or the like. The characteristics may also be based on a user profile. The characteristics may identify the capability of the client. At least one of the characteristics may be selected and/or the characteristics may be otherwise filtered.

The characteristics are mapped onto one or more labels. As used herein, the term "label" refers to a category of characteristics of client devices. The mapping may be a many-to-one mapping. In one embodiment, many characteristics may be mapped onto one label. A unique key is generated based on the request (e.g. NRI), the characteristics, and/or the label. A version of the resource to be cached is determined based on the request (e.g. NRI), the characteristics, the label, and/or the unique key. The version of the content is cached based on the unique key. Subsequent retrieval of the content based on the unique key returns the version of the content. In one embodiment, a requestee may determine the characteristics, map onto a label, and/or cache the version of the resource.

Illustrative Operating Environment

Users on the Internet require speed and reliability when requesting content from web servers. The web servers may have a delay in providing content or may intermittently fail to provide content because of technical problems. Web proxies can cache content sent to clients with the goal of enabling subsequent requests to be handled more quickly or reliably. Web proxies can cache a copy of content for a requested Uniform Resource Identifier (URI), Uniform Resource Locator (URL), Uniform Resource Name (URN), or other link that identifies the content, and can provide the cached copy in subsequent requests for the same link.

FIG. 1 illustrates one embodiment of an environment in which the invention may operate. However, not all of these components may be required to practice the invention, and variations in the arrangement and type of the components may be made without departing from the spirit or scope of the invention.—

As shown in the figure, system 100 includes first and second client devices 102-103, network 120, traffic management device (TMD) 105, and first and second server devices 108-109.

Generally, first and second client devices 102-103 may include virtually any computing device capable of connecting to another computing device to send and receive information, including web requests for information from a server device, and the like. The set of such devices may include devices that typically connect using a wired communications medium such as personal computers, multiprocessor systems, microprocessor-based or programmable consumer electronics, network PCs, and the like. The set of such devices may also include devices that typically connect using a wireless communications medium such as cell phones, smart phones, radio frequency (RF) devices, infrared (IR) devices, integrated devices combining one or more of the preceding devices, or virtually any mobile device. Similarly, first and second client devices 102-103 may be any device that is capable of connecting using a wired or wireless communication medium such as a PDA, POCKET PC, wearable computer, and any other device that is equipped to communicate over a wired and/or wireless communication medium.

First and second client devices 102-103 may further include a client application that is configured to manage various actions. Moreover, first and second client devices 102-103 may also include a web browser application that is configured to enable an end-user to interact with other devices and applications over network 120.

First and second client devices 102-103 may communicate with network 120 employing a variety of network interfaces and associated communication protocols. First and second client devices 102-103 may, for example, use various dial-up mechanisms with a Serial Line IP (SLIP) protocol, Point-to-Point Protocol (PPP), and the like. As such, first and second client devices 102-103 may transfer data at a low transfer rate, with potentially high latencies. For example, first and second client devices 102-103 may transfer data at about 14.4 to about 46 kbps, or potentially more. In another embodiment, first and second client devices 102-103 may employ a higher-speed cable, Digital Subscriber Line (DSL) modem, Integrated Services Digital Network (ISDN) interface, ISDN terminal adapter, or the like. As such, first and second client devices 102-103 may be considered to transfer data using a high bandwidth interface varying from about 32 kbps to over about 622 Mbps, although such rates are highly variable, and may change with technology. Further, first client device 102 may transfer data at a different rate then second client device 103.

Network 120 is configured to couple first and second client devices 102-103, with other network devices, such as TMD 105, or the like. Network 120 is enabled to employ any form of computer readable media for communicating information from one electronic device to another. In one embodiment, network 120 may include the Internet, and may include local area networks (LANs), wide area networks (WANs), direct connections, such as through a universal serial bus (USB) port, other forms of computer-readable media, or any combination thereof. On an interconnected set of LANs, including those based on differing architectures and protocols, a router may act as a link between LANs, to enable messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art.

Network 120 may further employ a plurality of wireless access technologies including, but not limited to, 2nd (2G), 3rd (3G) generation radio access for cellular systems, Wireless-LAN, Wireless Router (WR) mesh, and the like. Access technologies such as 2G, 3G, and future access networks may enable wide area coverage for network devices, such as first and second client devices 102-103, or the like, with various degrees of mobility. For example, network 120 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like.

Furthermore, remote computers and other related electronic devices could be remotely connected to either LANs or WANs via a modem and temporary telephone link. In essence, network 120 includes any communication method by which information may travel between one network device and another network device.

Additionally, network 120 may include communication media that typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as, but not limited to, twisted pair, coaxial cable, fiber optics, wave guides, and other wired media and wireless media such as, but not limited to, acoustic, RF, infrared, and other wireless media.

One embodiment of a network device that could be used as TMD 105 is described in more detail below in conjunction with FIG. 3. Briefly, however, TMD 105 includes virtually any network device that manages network traffic. Such devices include, for example, routers, proxies, firewalls, load balancers, cache devices, application accelerators, devices that perform network address translation, any combination of the preceding devices, or the like. TMD 105 may control, for example, the flow of data packets delivered to or forwarded from an array of server device devices, such as first and second server devices 108-109. In one embodiment, messages sent between the TMD 105 and the first and second server devices 108-109 may be over a secure channel, such as an SSL connection. Similarly, messages sent between TMD 105 and first and second client devices 102-103 may also be over a secure channel.

TMD 105 may direct a request for a resource to a particular one of first and second server devices 108-019 based on network traffic, network topology, capacity of a server device, content requested, and a host of other traffic distribution mechanisms. TMD 105 may receive data packets from and transmit data packets to the Internet, an intranet, or a local area network accessible through another network. TMD 105 may recognize packets that are part of the same communication, flow, and/or stream and may perform special processing on such packets, such as directing them to the same server device so that state information is maintained. TMD 105 also may support a wide variety of network applications such as Web browsing, email, telephony, streaming multimedia and other traffic that is sent in packets. The BIG-IP® family of traffic managers, by F5 Networks Inc. of Seattle, Wash., are examples of TMDs. TMDs are described in more detail in U.S. Pat. No. 7,102,996 to Amdahl, et al. entitled "Method and System for Scaling Network Traffic Managers," which is incorporated herein by reference. In one embodiment, TMDs 105 may be integrated with one or more of first and second server devices 108-109, and provide content or services in addition to the TMD functions described herein.

Further, TMD 105 may be implemented using one or more personal computers, server devices, multiprocessor systems, microprocessor-based or programmable consumer electronics, network PCs, radio frequency (RF) devices, infrared (IR) devices, integrated devices combining one or more of the preceding devices, and the like. Such devices may be implemented solely in hardware or in hardware and software. For example, such devices may include some application specific integrated circuits (ASICs) coupled to one or more microprocessors. The ASICs may be used to provide a high-speed switch fabric while the microprocessors may perform higher layer processing of packets.

TMD 105 may receive requests from first and second client devices 102-103. TMD 105 may select one or more of the first and second server devices 108-109 to forward the request. TMD 105 may employ any of a variety of criteria and mechanisms to select first and second server devices 108-109, including those mentioned above, load balancing mechanisms, and the like. TMD 105 may receive a response to the request and forward the response to first and second client devices 102-103.

In one embodiment, TMD 105 may be configured to manage content over network 120. TMD 105 may receive a request for a resource from one of first and second client devices 102-103 over network 120. TMD 105 may determine characteristics of one of first and second client devices 102-103 based on the request. TMD 105 may also generate a unique key based in part on the request and/or the characteristics. In one embodiment, a version of the resource to cache is determined by TMD 105 based in part on the request and/or the characteristics. In one embodiment, TMD 105 may determine which of first and second server devices 108-109 to forward the request for the resource. For example, first and second server device 108 may be configured to provide a high-bandwidth resource (e.g. richer content), whereas first and second server device 109 may be configured to provide a low-bandwidth resource (e.g. simple content, text content). For example, TMD 105 may determine from the characteristics that first client device 102 is a low-bandwidth client. Thus, TMD 105 may forward the request for a resource from first client device 102 to second server device 109. Moreover, TMD 105 may load-balance the request across one of first and second server devices 108-109. TMD 105 may then receive the version of the resource from second server device 109. In one embodiment, the version of the resource is cached on TMD 105, based on the unique key. TMD 105 may provide the version of the resource to first client device 102.

First and second server devices 108-109 may include any computing device capable of communicating packets to another network device. Each packet may convey a piece of information. A packet may be sent for handshaking, i.e., to establish a connection or to acknowledge receipt of data. The packet may include information such as a request, a response, or the like. Generally, packets received by first and second server devices 108-109 may be formatted according to TCP/IP, but they could also be formatted using another transport protocol, such as SCTP, UDP, NetBEUI, IPX/SPX, token ring, similar IPv4/6 protocols, and the like. Moreover, the packets may be communicated between first and second server devices 108-109, TMD 105, and first and second client devices 102-103 employing HTTP, HTTPS, RTSP, or any of a variety of current or later developed protocols.

In one embodiment, first and second server devices 108-109 may be configured to operate as a website server. However, first and second server devices 108-109 are not limited to web server devices, and may also operate a messaging server, a File Transfer Protocol (FTP) server, a database server, content server, and the like. Additionally, each of first and second server devices 108-109 may be configured to perform a different operation. Thus, for example, first server device 108 may be configured as a messaging server, while second server device 109 may be configured as a database server. Moreover, while first and second server devices 108-109 may operate as other than a website, they may still be enabled to receive an HTTP communication, an RTSP communication, as well as a variety of other communication protocols.

Devices that may operate as first and second server devices 108-109 include personal computers, desktop computers, multiprocessor systems, microprocessor-based or programmable consumer electronics, network PCs, server devices, and the like.

It is further noted that terms such as client and server device may refer to functions within a device. As such, virtually any device may be configured to operate as a client device, a server device, or even include both a client and a server device function. As described above, the client device may request the network resource, and TMD 105 may reply with the appropriate version of the content for the requestor client device. However, virtually any device may act as a requestor (e.g., first and second client devices 102, 103) or requestee (e.g., first and second server devices 108, 109) in accordance with the one or more embodiments of the present invention. Any requestor may send a request for a network resource to a requestee, wherein the network resource is uniquely identified on network 120 using a URI, although other network resource identifiers could be used. The requestee may cache a particular version of the resource based on characteristics of the requestor as described herein. Thus, the requestor or requestee may include a client/ or a server architectural approach, as well. Furthermore, where two or more peers are employed, any one of them may be designated as a client or as a server, and be configured to conform to the teachings of the present invention. For example, in a peer-to-peer network, one peer may act as the requestor, and another peer may act as the requestee. Thus, the invention is not to be construed as being constrained to a client/server architecture.

Figure 2:
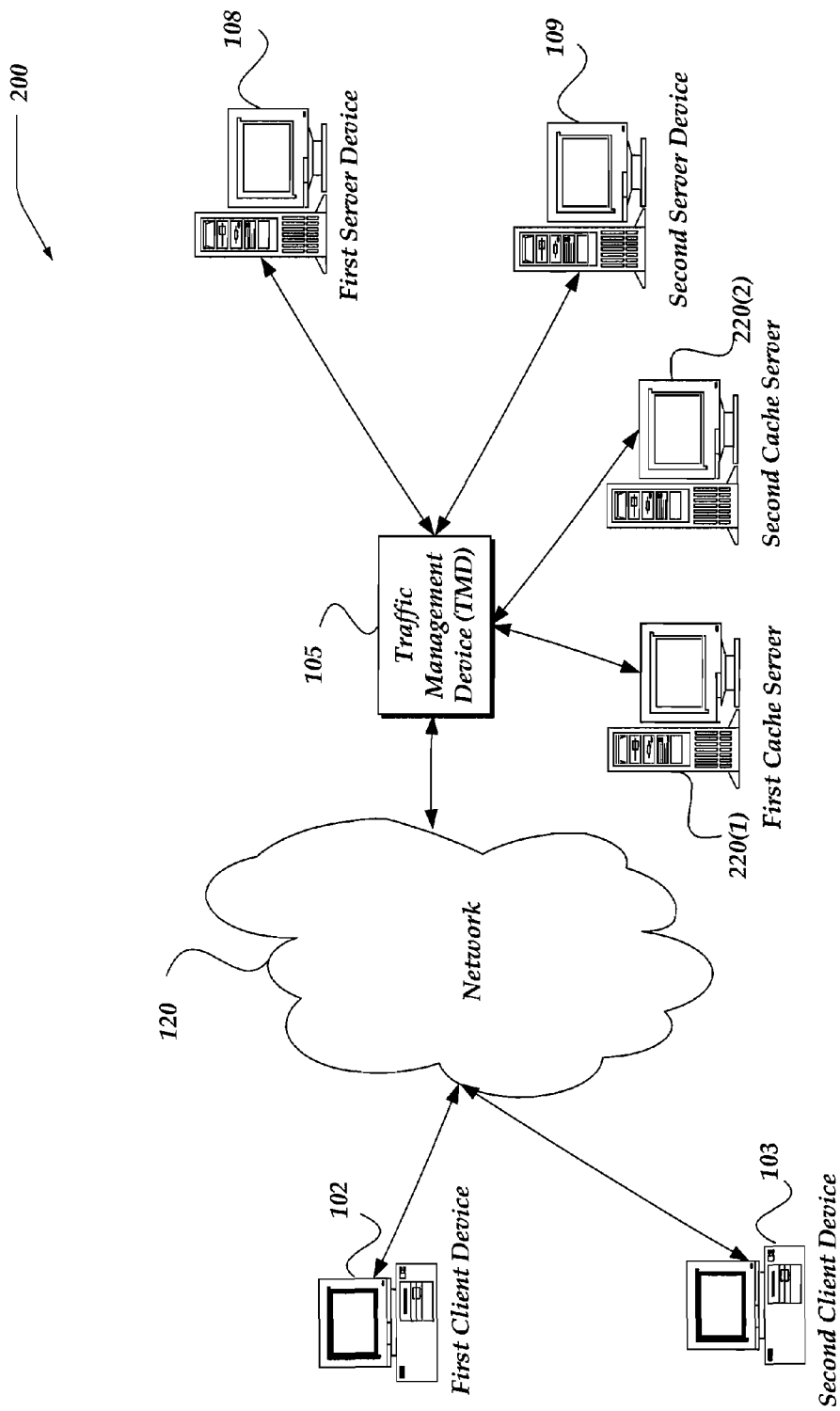
FIG. 2 shows another block diagram illustrating an environment for practicing the invention.

FIG. 2 illustrates another embodiment of an environment in which the invention may operate. As shown, system 200 of FIG. 2 includes the components of FIG. 1.

Additionally, system 200 also includes first and second cache servers 220(1)-220(2). First and second cache servers 220(1)-220(2) are in communication with TMD 105. First and second cache servers 220(1)-220(2) may include any computing device capable of communicating packets to another network device. First and second cache servers 220(1)-220(2) may be configured to store, provide, or otherwise manage data caching. In one embodiment, first and second cache servers 220(1)-220(2) may include a cache, such as a RAM cache, a database, a datastore, a hash table, a b-tree, or the like. In one embodiment, TMD 105 may determine one of the first and second cache servers 220(1)-220(2) to cache a resource, although TMD 105 itself may directly cache the resource in one or more other embodiments. The determination may be based on a unique key associated with the resource and/or the resource itself. In one embodiment, the TMD 105 may load-balance the caching across first and second cache servers 220(1)-220(2).

Illustrative Network Device

Figure 3:
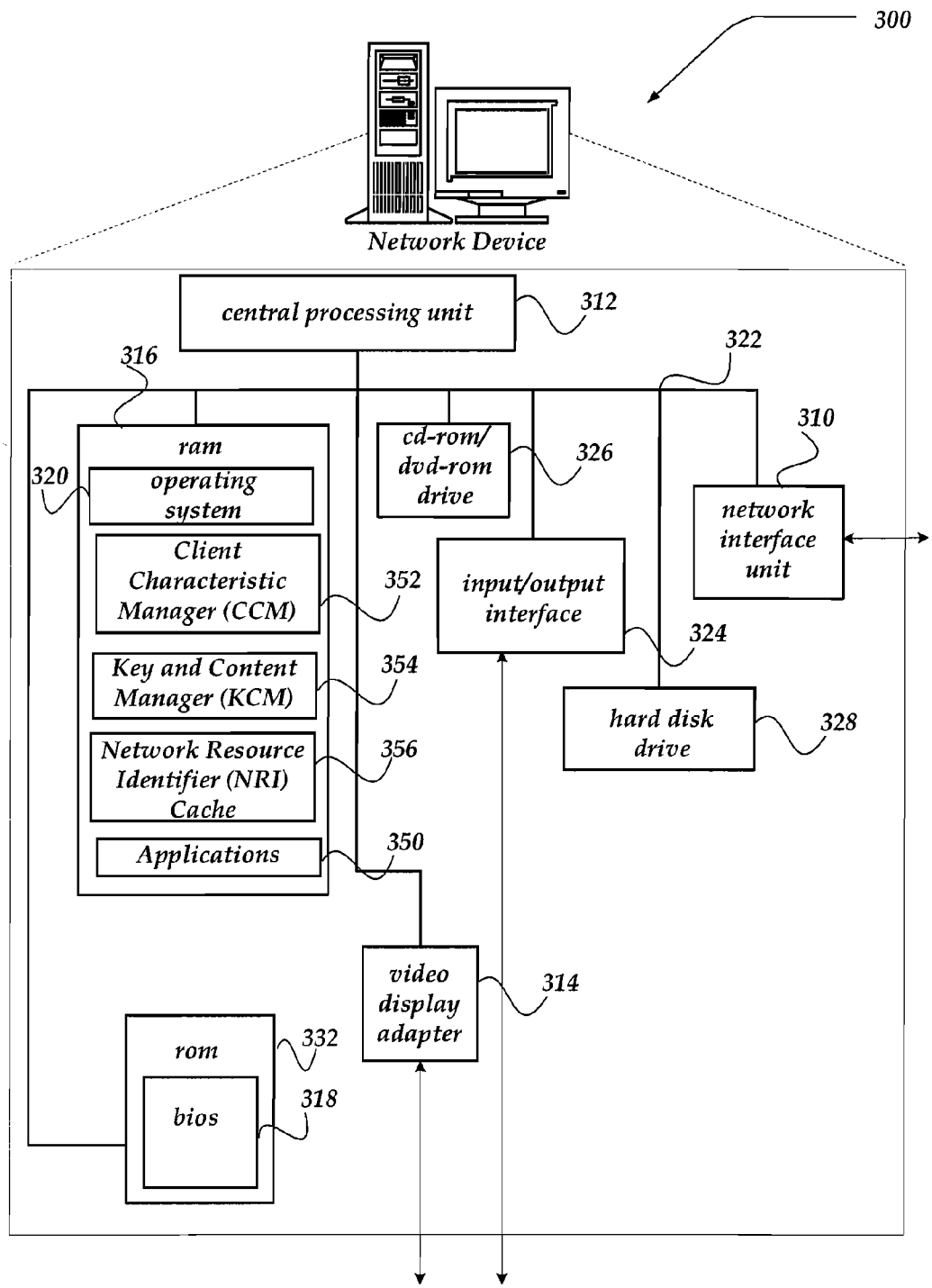
FIG. 3 illustrates one embodiment of a network device for managing content over a network.

FIG. 3 shows one embodiment of a network device, according to one embodiment of the invention. Network device 300 may include many more or less components than those shown. The components shown, however, are sufficient to disclose an illustrative embodiment for practicing one or more embodiments of the invention. Network device 300 may represent, for example, TMD 105 of FIG. 1.

Network device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of network device 300. Network device 300 also includes applications 350, Client Characteristic Manager (CCM) 352, Network Resource Identifier (NRI) cache 356, and Key and Content Manager (KCM) 354, which may be expressed as one or more executable instructions stored at one or more locations within RAM 316, although the instructions could be stored elsewhere.

As illustrated in FIG. 3, network device 300 also can communicate with the Internet, or some other communications network via network interface unit 310, which is constructed for use with various communication protocols including the TCP/IP protocol. Network interface unit 310 is sometimes known as a transceiver, transceiving device, or network interface card (NIC).

The mass memory 316, 326, 328, 332 described herein and shown in FIG. 3 illustrates another type of computer-readable media, namely computer storage media. Computer storage media may include volatile, nonvolatile, removable, and non-removable media implemented in any method or technology for storage of information, such as computer readable instructions, data structures, program modules, or other data, which may be obtained and/or executed by CPU 312 to perform one or more portions of processes 400 and 500 shown in FIGS. 4 and 5, respectively, for example. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory may also store other types of program code and data as applications 350, which may be are loaded into mass memory and run on operating system 320. Examples of application 350 may include email client/server programs, routing programs, schedulers, calendars, database programs, word processing programs, HTTP programs, RTSP programs, traffic management programs, security programs, and any other type of application program.

Network device 300 may also include an SMTP handler application for transmitting and receiving e-mail, an HTTP handler application for receiving and handing HTTP requests, a RTSP handler application for receiving and handing RTSP requests, and an HTTPS handler application for handling secure connections. The HTTPS handler application may initiate communication with an external application in a secure fashion. Moreover, network device 300 may further include applications that support virtually any secure connection, including TLS, TTLS, EAP, SSL, IPSec, and the like.

Network device 300 may also include input/output interface 324 for communicating with external devices, such as a mouse, keyboard, scanner, or other input/output devices not shown in FIG. 3. Likewise, network device 300 may further include additional mass storage facilities such as CD-ROM/DVD-ROM drive 326 and hard disk drive 328. Hard disk drive 328 may be utilized to store, among other things, application programs, databases, and the like in the same manner as the other mass memory components described above.

In one embodiment, the network device 300 may include at least one Application Specific Integrated Circuit (ASIC) chip (not shown) coupled to bus 322. The ASIC chip can include logic that performs some or all of the actions of network device 300. For example, in one embodiment, the ASIC chip can perform a number of packet processing functions for incoming and/or outgoing packets. In one embodiment, the ASIC chip can perform at least a portion of the logic to enable the operation of CCM 352, KCM 354, or any other components.

In one embodiment, network device 300 can further include one or more field-programmable gate arrays (FPGA)

(not shown), instead of, or in addition to, the ASIC chip. A number of functions of network device 300 can be performed by the ASIC chip, the FPGA, by CPU 312 with instructions stored in memory, or by any combination of the ASIC chip, FPGA, and CPU.

CCM 352 is configured to determine and/or otherwise manage characteristics of a client (e.g., first, second client devices 102, 103). CCM 352 may receive, intercept or otherwise obtain a request for a resource from the client over network interface unit 310. CCM 352 may determine the characteristics of the client based on information associated with the request. For example, CCM 352 may: detect the Maximum Segment Size (MSS) based on OSI layer 2 or 3 data of the request; calculate the Round Trip Time (RTT) for a message to be sent and a reply to be received from the client; and/or determine if SSL is being used to encrypt the request based on OSI layer 4 data of the request, although other information or combinations of information may be used to encrypt the request.

CCM 352 may select a subset of the characteristics and/or may otherwise filter the characteristics. In one embodiment, CCM 352 may apply selection/filtering rules to the characteristics to provide the subset. These rules may be stored in any datastore, residing on hard disk drive 328, or the like. CCM 352 may provide an interface to create, modify, or edit the rules, by a user, such as an administrator of network device 300, through for example, input/output interface 324, and/or network interface unit 310. Examples of selection/filtering rules may include scripts, if-then rules, pattern match rules, or the like. An example of a selection/filtering rule that selects the MSS and RTT characteristics, and that filters out the device type of the client is: "SELECT MSS, RTT; FILTER DEVICE-TYPE." In one embodiment, further operations performed on the characteristics may be performed instead on the subset. In another embodiment, the rules may be a script (e.g. programmatic instructions), which when executed by CPU 312, enable device 300 to determine how the labeling takes place. The script allows for dynamic processing and may be executed at the time CCM 352 processes a client request, for example.

CCM 352 may provide the characteristics and/or subset of characteristics to other components for further processing. In one embodiment, CCM 352 may map the characteristics onto a label. Examples of labels include "HIGH-SPEED", "LOW-SPEED", "HIGH-GRAPHICS", "LOW-GRAPHICS", "YOUTH", "ADULT", or the like. The mapping may be a many-to-one mapping. The mapping may be enabled by mapping rules, which are stored and operated in the same manner as the selection/filtering rules described above. An example of a mapping rule that maps a category of MSS onto the label "HIGH-SPEED" is: "IF MSS>550 AND MSS<570 THEN MAP TO 'HIGH-SPEED'." However, the embodiments of the invention are not limited to these examples; and virtually any characteristic or set of characteristics may be used to generate a label. Moreover, more than one label may be used to generate a key.

KCM 354 may be configured to generate a unique key based in part on the request and/or the characteristics. KCM 354 may receive the characteristics from CCM 352. KCM 354 may apply virtually any key generation algorithm to the characteristics to generate the unique key, including hash-coding, semi-random coding, Cyclic Redundancy Check (CRC) coding, or the like. KCM 354 may determine a version of the resource to cache by requesting the resource from a server over network interface unit 310, or the like. KCM 354 may also determine the version of the resource by requesting applications 350 to process the resource to generate the version of the resource. KCM 354 may send the unique key and the associated version of the resource to NRI cache 356 for further processing.

NRI cache 356 includes any mechanism for caching, including a RAM cache, a database, a datastore, a hash table, a b-tree, or the like. NRI cache 356 may be configured to store a resource associated with a unique key. NRI cache 356 may also provide the resource for a given unique key, over network interface unit 310, or the like.

Figure 4:
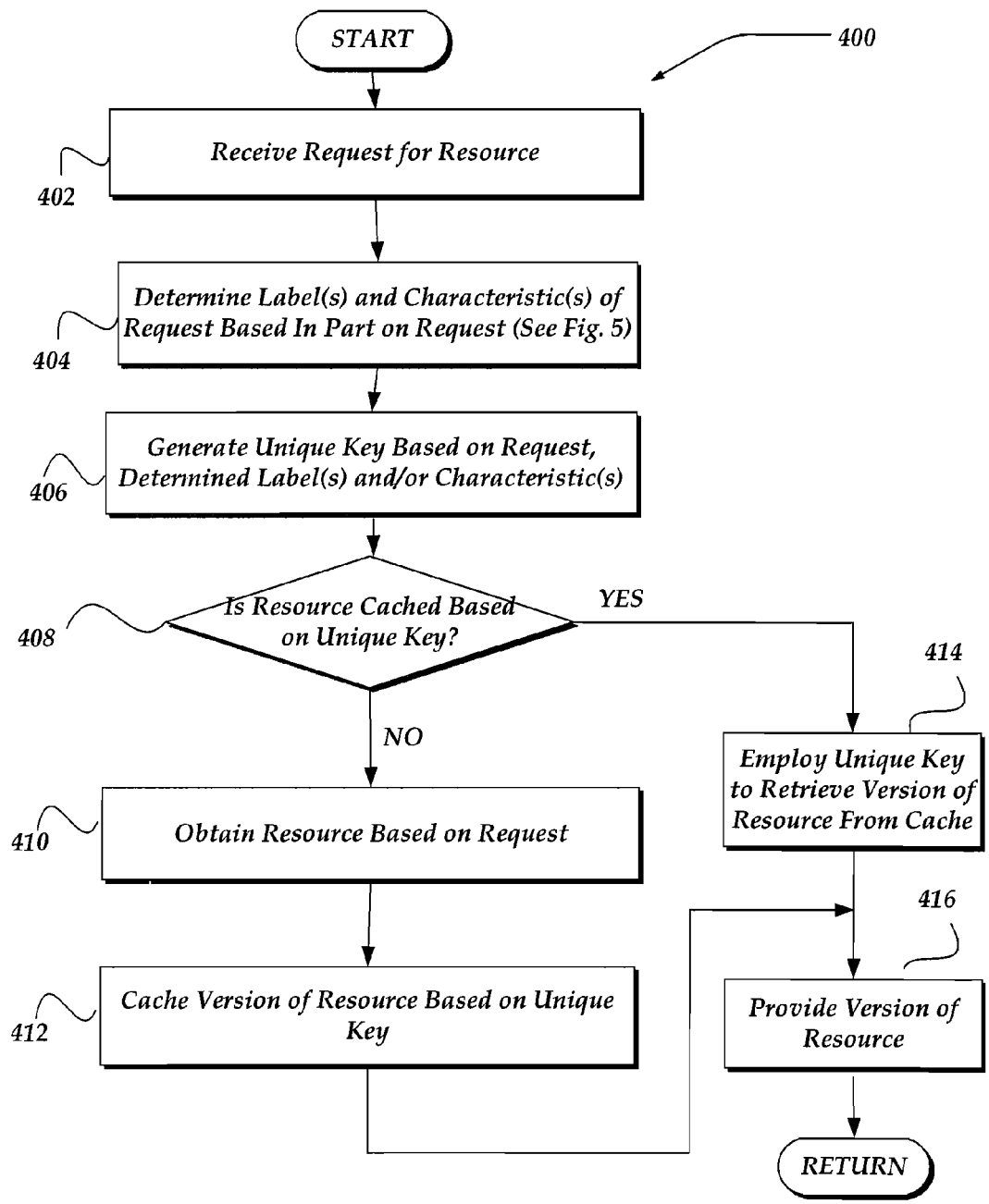
FIG. 4 illustrates a logical flow diagram generally showing one embodiment of a process for managing content over a network.

In one embodiment, CCM 352, KCM 354, and NRI cache 356 are enabled to perform the process described in more detail below in conjunction with FIGS. 4-5.

Generalized Operation

The operation of certain aspects of the invention will now be described with respect to FIGS. 4-5. FIG. 4 illustrates a logical flow diagram generally showing one embodiment of a process for managing content over a network. Process 400 of FIG. 4 may be implemented, for example, within TMD 105, or first and second server devices 108-109 of FIG. 1, TMD 105 and/or first and second cache servers 220(1)-220(2) of FIG. 2.

Process 400 begins, after a start block, at block 402, where a request for a resource is received from a client (e.g. a requestor, one of first and second client devices 102-103 of FIG. 1). In one embodiment, the request may be received, over a network 120. The request may include a network resource identifier (NRI). The NRI may identify the resource requested and/or where the resource is located. The NRI may include a Uniform Resource Identifier (URI) to identify the (original) location of the resource, or the like. The request may also include Open Systems Interconnection (OSI) level 2-7 data and/or transport protocol header information (e.g. HTTP header information, RTSP header information) for specifying, among other things, the client's capabilities, type, or the like.

Processing continues next to block 404. Block 404 is described in more detail in conjunction with process 500 of FIG. 5. Briefly, however, at block 404, at least one characteristic of the request may be determined and at least one label may be determined. In one embodiment, the characteristic(s) may be determined based on a variety of information, including information associated with the request, characteristics of a client sending the request, characteristics of a user of the client sending the request, network metrics associated with sending the request, or the like. Moreover, in one embodiment, at least one label designating at least one category of the determined characteristic(s) may be determined. In one embodiment, the labels may identify one or more content delivery conditions (e.g. characteristics), for example, to be satisfied during subsequent content requests in order to enable a particular requestor of the requested content to consume the requested content. In one embodiment, the content delivery conditions may further comprise at least one of one or more requestor capabilities, one or more network conditions existing when the associated content is requested or provided, or any other type of condition that may affect content delivery to the particular requestor. In one embodiment, the requestor capabilities may comprise an ability to receive high resolution video, graphics content, multimedia content, text-only content, or the like. The network conditions may comprise network latency, bandwidth, or throughput. Other types of conditions that may affect content delivery to the particular requestor may comprise a particular geographical location of the requestor, a particular network location of the requestor, or the like.

Figure 5:
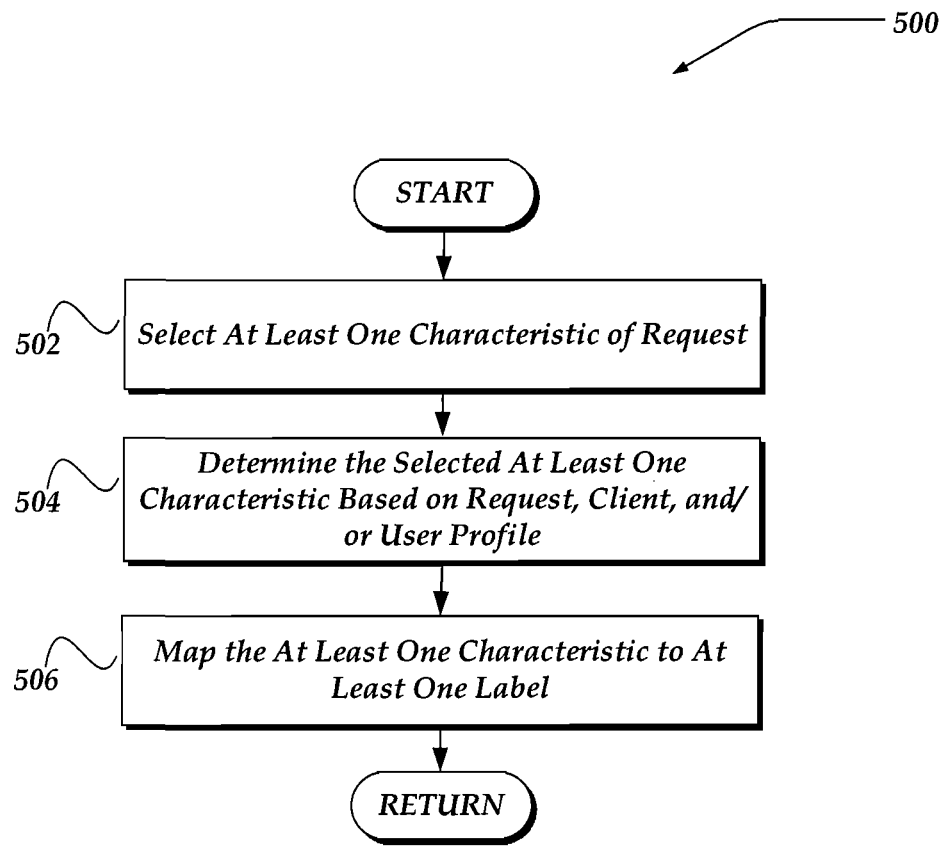
FIG. 5 illustrates a logical flow diagram generally showing one embodiment of a process for generating a unique key for managing content over a network.

The label may be determined by a many-to-one mapping, as described in conjunction with FIG. 5. The many-to-one mapping may be a mapping that collapses several characteristics onto one label representing one semantic group, class or category. As described below in conjunction with blocks 406 and 416, the mapped label may be used in part to generate a key, and the key may be used to cache a resource. In this embodiment, the use of the mapped label enables the mapping of many keys onto one key. Thus, the use of a many-to-one mapping of the label may reduce storage requirements for caching the resource because of the reduction in associations between keys and resources in the cache.

Processing then continues to block 406 where a unique key is generated based on information associated with the request (e.g. the NRI), the determined characteristic(s), and/or the determined label(s). In one embodiment, generating the unique key based on at least one of the plurality of the characteristics comprises applying at least one of hash-coding, semi-random coding, or Cyclic Redundancy Check (CRC) coding to the plurality of the characteristics.

In one embodiment, the label(s) may be added to the request to generate an extended request. For example, the label(s) may be added to the NRI to generate an extended NRI. The label(s) may be added in any form, including prepending, appending, interlacing, or the like. In one embodiment, the addition is lossless (e.g. no information is lost in the addition of the label to the NRI). In one embodiment, a separator, such as a "/" may be added between the label(s) and the NRI. For example, where the NRI represents a URI with the value "www.foo.com/movie.mpg," the label "high-speed" and the separator may be added to the NRI to form "www.foo.com/movie.mpg/high-speed." However, the label may also be combined using any of a variety of other mechanisms. For example, in one embodiment, the label or labels may be concatenated with the file name, such as: "www.foo.com/resource.jpg/LABEL1/LABEL2."

In one embodiment, the unique key may comprise several labels, including a first label, a second label(s), etc. In this embodiment, the key may be generated based in part on the NRI as described above and one or more labels describing various client conditions, network conditions, or any other conditions.

For example, the plurality of characteristics may be determined to include an ability for the client to transcode files of type "LABEL1" and "LABEL2." Further, "LABEL3" and "LABEL4" may describe network conditions and a "LABEL5" may describe a geographic location of a client.

Processing then continues to decision block 408 where it is determined whether the resource is cached based on the unique key. In one embodiment, the resource may be previously cached, and thus associated with the unique key in the cache. As an example, the resource may be included in one row of a database, and the unique key may be associated with that row by being the primary key (and optionally at least one secondary key) of that row.

In one embodiment, where the key comprises a plurality of different types of labels that may describe at least one of network conditions, client capabilities, or any other conditions under which the associated resource may be optionally be consumed by a requesting client, the resource is determined to be cached if the conditions described by the various labels comprising the key match the corresponding characteristics of the client requesting the resource, the network conditions that exist for providing the content to the client, or the like. In one embodiment, if the unique key is not associated with any resource within the cache, then the resource is determined to be un-cached (e.g., not currently located in cache). If it is determined that the resource is cached, then processing continues to block 414. Otherwise, if it is determined that the resource is un-cached, processing continues to block 410.

At block 410, the version of the resource is obtained based in part on the request. In one embodiment, the resource may be obtained based additionally on the determined characteristics. In one embodiment, the resource may be obtained by retrieving the resource from a datastore, or the like.

In one embodiment, the request may be forwarded to a server associated with providing the appropriate version of the content for a particular category of connection speed, processing capacity, mobility, or the like, specified by at least one of the characteristics for the client and/or other conditions (e.g., network, geographic, etc). In one embodiment, the forwarding may be performed by a traffic management device (e.g. requestee), such as TMD 105 of FIG. 1. For example, a server associated with providing resources for high bandwidth clients may receive the forwarded request originating from a high bandwidth client. The server may reply with the version of the resource associated with the particular category. In one embodiment, the TMD 105 may select the server to receive the forwarded request based on at least one characteristic of the client making the request comprising at least one of a network connection speed associated with the client device, an application type residing on the client device, or the like.

In another embodiment, the request may be modified to include information associated with the particular category before being sent to a server, such as one of servers 108-109. In one embodiment, the modification may be performed by a traffic management device (e.g. requestee), such as TMD 105. The server may respond with the appropriate type of resource associated with the particular category based on the modified request. For example, the network resource identifier associated with the request may be expressed as a URI specified as "www.domain.com/movie.mpg," which when associated a low bandwidth client can be modified to be "www.domain.com/lowbandwidth/movie.mpg," and delivered to a server. In response to the modified request, the server provides the appropriate resource associated with the particular category.

In one embodiment, the retrieved resource (e.g. retrieved from the data store and/or from a server) may be modified based on the at least one characteristic prior to providing the resource to the client. In one embodiment, the modification may be performed by a traffic management device (e.g. requestee), such as TMD 105. For example, the resource may be converted to text based on a characteristic of the request that identifies that the client is capable of accepting text data. In another embodiment, the version of the resource may be algorithmically modified based on the determined characteristics. For example, based on the capability of the client to perform transcoding, displaying low resolution images, decryption, or the like, TMD 105 may algorithmically modify the resource into a version of the resource that is transcoded, dithering, decrypted, or the like, as appropriate. In one embodiment, the text and/or other data (e.g. graphics, spoken voice, sound, signs) of the resource may be translated into a language spoken by a user of client, or the like.

Processing then continues to block 412 where the version of the resource is cached in a cache based on the unique key. The cache may associate the version of the resource with the unique key. In one embodiment, caching comprises selecting one of a plurality of caches (e.g. cache devices 220-221 or FIG. 2) to store the resource based at least in part on the unique key. This selection of one of the plurality of caches may provide for load-balancing the caching across several caches. The several different caches may be of the same capacity, different capacity, or even different types (e.g. in-memory and/or out-of memory caches). In one embodiment, where a plurality of keys are generated for the resource (e.g. keys with a first and second portion), each one of the plurality of keys may be associated with different version of the resource in the cache. Processing then continues to block 416.

At block 414, the unique key may be employed to retrieve the resource from the cache. In one embodiment, the unique key may be searched for in the cache, and the version of the resource associated with the unique key may be returned if the unique key is found. In one embodiment, retrieving the resource from the cache comprises selecting an appropriate one of the plurality of load-balanced cache devices to provide the version of the resource. Processing then continues to block 416.

At block 416, the version of the resource is provided. In one embodiment, the version of the resource may be retrieved from the cache. In one embodiment, in which processing flows from blocks 410 and 412, the version of the resource may be provided from the non-cache server, from an application of an algorithm, or even from the cache. In one embodiment, the version of the resource may be provided to the client, over a network. In one embodiment, the version of the resource may be provided to the client as it is being obtained and/or cached. In this embodiment, block 416 may operate in parallel with block 410 and/or block 412. Thus, in one embodiment, a TMD (e.g. requestee), such as TMD 105 of FIG. 1, may stream a portion of the version of the resource as the TMD obtains and caches the portion, and before all portions of the version of the resources has been obtained. Processing then returns to a calling process for further processing.

In one embodiment (not shown), process 400 may also pre-cache at least another version of the resource. In one embodiment, the other version of the resource is different than the version of the resource. At block 404, other labels and/or characteristics associated with the request may be determined. In one embodiment, the label is determined, as described above. Another label may be determined based on the characteristics of the request and/or the determined label. In one embodiment, the other label may be selected from a set of categories (e.g. "HIGH-SPEED", "MEDIUM-SPEED, "LOW-SPEED") to which the determined label (e.g. "LOW-SPEED") also belongs. At block 406, another unique key may be generated based on the other label(s) and/or other characteristics. At block 410, another version of the resource may be obtained based on the request and/or the determined other label. The other version may be obtained by modifying the request to include an indication of the type of the other version/determined other label (e.g., "www.domain.com/movie.mpg" is combined with the determined other label "low-bandwidth," to generate "www.domain.com/lowbandwidth/movie.mpg"). The other version of the resource may be obtained by routing the (modified) request to a server to provide the other version of the resource, or the like. At block 412, the other version of the resource may also be cached by being associated with the other generated key in the cache. Processing then continues as described above.

FIG. 5 illustrates a illustrates a logical flow diagram generally showing one embodiment of a process for generating a unique key for managing content over a network. Process 500 of FIG. 5 may be implemented, for example, within TMD 105, or first and second server device 108-109 of FIG. 1, TMD 105 and/or first and second cache servers 220(1)-220(2) of FIG. 2.

Process 500 begins, after a start block, at block 502, where at least one characteristic of a client may be selected. Selecting may be based on a rule set (e.g. administrator specified choices). Selecting may also be determined based on a capacity of the cache, the load associated with the cache, or the like.

Processing then continues to block 504 where the at least one characteristic of the client may be determined based in part on the request, client, and/or user profile. In one embodiment, determining of the at least one characteristic of a client may be based at least one of OSI level 2-7 data included in the request, a profile of a user associated with the request, characteristics of the network connection, or the like. In one embodiment, the at least one characteristic may be determined by performing an analysis of at least one of layers 2-7 of the OSI layered protocol of the request. In one embodiment, the at least one characteristic of the client may comprise at least a Maximum Segment Size (MSS), a Round Trip Time (RTT), a Hypertext Transfer Protocol (HTTP) header information, a Real Time Streaming Protocol (RTSP) header information, a network connection speed, or the like. In one embodiment, the transport protocol header information may include a specification of a user agent, an indicator that identifies that the client is capable of accepting encoded data, a protocol version (e.g. HTTP/1.1), a request method (e.g. GET, PUT, DELETE, HEAD), an indicator that identifies that the client is capable of using a secure protocol such as Hyper Text Transfer Protocol Secure (HTTPS), or the like.

In one embodiment, the at least one characteristic may be determined based on an access right associated with a user of the client device (e.g. user profile), a characteristic of the user of the client device, a capability of the client device, or the like. In one embodiment, the at least one characteristic may be based on different capabilities of the client, including different combinations of at least one of a connection speed, processing speed, browser type, operating system, or the like. In one embodiment, the profile of the user may be determined from a cookie received from the client. The profile may include information such as an age, gender and/or nationality of the user, a language spoken by the user, a permission level of the user, a location of the user, or the like. Such information may also be obtained from a datastore (e.g. from at least one of first and second server devices 108-109 of FIG. 1) based on an association between the information and the client.

Processing then continues to block 506 where the at least one characteristic is mapped onto a label. In one embodiment, the mapping may be a many-to-one mapping. In this embodiment, many characteristics are mapped onto one label. In one embodiment the mapping may be based on a membership of at least one of the characteristics in a group (e.g. a semantic class). The group may define a speed, capacity, mobility, or the like, of a client.

A group may define a range of the at least one characteristic. For example, a group labeled "high-speed" may encompass MSS between 1000-1500. If the determined MSS characteristic associated with the client is between 1000 and 1500, then the MSS characteristic may be mapped to the label "high-speed."

A group may also be a set of several characteristics. In this embodiment, the value of a characteristic may be an alphanumeric string, or the like. If the characteristic is in the set, then the characteristic is mapped onto a label representing the set. This mapping defines a many-to-one mapping. For example, the characteristic may be an operating system, and/or a build and version number obtained from transport protocol header information of the request (e.g. "MAC OS 7.5.1", "Windows Mobile 2003"). The group/set may include several types of mobile device operating systems. If the characteristic is in this set, then the characteristic is mapped to the label "MOBILE DEVICE." As another example, for the label "GRAPHICS-CAPABLE," the group may be ("JPEG", "GIF", "PNG"). In this example, if the client's characteristic indicates that the client is capable of providing JPEG, GIF, or PNG content, then the characteristic is mapped onto the label "GRAPHICS-CAPABLE."

In one embodiment, the group membership may be determined by a plurality of combinations of characteristics, or the like (e.g. MSS and RTT; MSS and user profile; MSS, RTT and user profile). It will be appreciated that a group may be determined by a set, a list, algorithmically, by threshold comparisons, or the like. In one embodiment, a coverage of the group may be changed based on a capacity of a cache to store the resource.

Processing then returns to a calling process for further processing.

It will be understood that each block of a flowchart illustration need not be limited in the ordering shown in the illustration, and may be performed in any ordering, or even performed concurrently, without departing from the spirit of the invention. It will also be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A device that manages data over a network, comprising:
   a network communication component that sends or receives content over the network, wherein the network communication component is stored in a memory; and
   a processor that performs one or more actions involving the content, including:
      receiving a first request for the content from a first requestor;
      determining characteristics of the first requestor that enable the first requestor to consume the content based in part on determined characteristics of the first request;
      generating a particular version of the content based on the determined characteristics of the first requestor;
      obtaining a resource version key associated with the particular version of the content based on having a network resource identifier that identifies an original location of the content and at least one label that identifies one or more of the determined characteristics of the first request for content delivery conditions that enable the first requestor of the content to consume the particular version of the content that is associated with the resource version key;
      executing at least one of a plurality of pre-determined scripts to map a category onto the at least one label based on one or more of the determined characteristics of the first request;
      mapping the at least one label having a mapped category to a plurality of content delivery conditions that collapse a plurality of determined characteristics of the first request onto the at least one label and a plurality of resource version keys, wherein the at least one mapped label reduces the number of associations between the resource version keys and the particular versions of the content;
      generating a unique key based on the network resource identifier and at least one mapped label;
      caching the particular version of the content based on the unique key;
      receiving a second request for the content from a second requestor;
      determining that one or more content delivery conditions are satisfied based on a match between the one or more content delivery conditions and one or more characteristics of the second requestor determined from an analysis of characteristics of the second request;
      modifying the second request by adding one or more of the at least one labels to the second request based on the one or more content delivery conditions, wherein each of the one or more labels is associated with a range of content delivery conditions that are part of a group; and
      employing the unique key to provide the cached particular version of the content for consumption by the second requestor when the one or more content delivery conditions described by the added labels matches the corresponding content delivery characteristics of the second requestor, wherein the cached particular version of the content is a modified version of the content that is modified based on the one or more content delivery conditions.

2. The device according to claim 1, wherein the one or more content delivery conditions further comprise at least one of one or more requestor capabilities, one or more network conditions existing when the associated content is requested or provided, or any other type of condition that may affect content delivery to a particular requestor.

3. The device according to claim 2, wherein the one or more requestor capabilities comprise an ability to receive high resolution video, graphics content, multimedia content, or text-only content.

4. The device according to claim 2, wherein the one or more network conditions comprise network latency, bandwidth, or throughput.

5. The device according to claim 1, wherein any other type of condition that affects content delivery to the particular requestor comprises a particular geographical location of at least one of the first requestor and the second requestor, or a particular network location of at least one of the first requestor and the second requestor.

6. The device according to claim 1, wherein the device comprises a traffic management device.

7. A device that manages data over a network, comprising:
a network communication component that sends or receives content over the network, wherein the network communication component is stored in a memory; and
a processor that performs one or more actions involving the content, including:
receiving a first request for content from a first requestor;
determining characteristics of the first requestor that enable the first requestor to consume the content based in part on determined characteristics of the first request;
generating a particular version of the content based on the characteristics of the first requestor;
generating a resource version key corresponding to the particular version of the
requested content based on having a network resource identifier (NRI) that identifies an original location of the requested content at least one label that identifies one or more existing characteristics of the first request for content delivery conditions that enables a particular requestor of the requested content to consume the particular version of the requested content that corresponds to the resource version key;
executing at least one of a plurality of pre-determined scripts to map a category onto the at least one label based on one or more of the determined characteristics of the first request;
mapping the at least one label having a mapped category to a plurality of content delivery conditions that collapse a plurality of determined characteristics of the first request onto the at least one label and a plurality of resource version keys, wherein the at least one mapped label reduces the number of associations between the resource version keys and the particular versions of the content;
generating a unique key based on the network resource identifier and at least one mapped label;
caching the particular version of the content based on the resource version key;
receiving at least one subsequent content request for the content from a second requestor;
determining that one or more content delivery conditions are satisfied based on a match between the one or more content delivery conditions and one or more characteristics of the second requestor determined from an analysis of the characteristics of the subsequent content request;
modifying the second request by adding one or more of the at least one labels to the second request based on the one or more content delivery conditions, wherein each of the one or more labels is associated with a range of content delivery conditions that are part of a group; and
employing the unique key to provide the cached particular version of the content for consumption by the second requestor when the one or more content delivery conditions described by the added labels matches the corresponding content delivery characteristics of the second requestor, wherein the cached particular version of the content is a modified version of the content that is modified based on the one or more content delivery conditions.

8. The device according to claim 7, wherein one or more different versions of the requested content are stored in memory directly in the device or elsewhere.

9. The device according to claim 7, wherein the one or more actions performed by the processor further comprise:
generating one or more different resource version keys with the same network resource identifier but at least one different label; and
obtaining one or more different versions of the requested content corresponding to the different content delivery conditions identified by the at least one different label.

10. The device according to claim 7, wherein the one or more actions performed by the processor further comprise:
generating one or more different versions of the requested content for consumption by at least one of the first and the second requestors when different content delivery conditions exist as identified by at least one different label included in one or more different resource version keys having the same network resource identifier.

11. The device according to claim 7, wherein the one or more content delivery conditions further comprise at least one of one or more requestor capabilities, one or more network conditions existing when the associated content is requested or provided, or any other type of condition that affects content delivery to a particular requestor.

12. The device according to claim 11, wherein the one or more requestor capabilities comprise an ability to receive high resolution video, graphics content, multimedia content, or text-only content.

13. The device according to claim 11, wherein the one or more network conditions comprise network latency, bandwidth, or throughput.

14. The device according to claim 7, wherein any other type of condition that affects content delivery to a particular requestor comprises a particular geographical location of at least one of the first requestor and the second requestor, or a particular network location of at least one of the first requestor and the second requestor.

15. The device according to claim 7, wherein the device comprises a traffic management device.

16. The device according to claim 7, wherein the NRI includes a Uniform Resource Identifier (URI).

17. The device according to claim 7, wherein the one or more existing content delivery conditions further comprises: at least one of a Maximum Segment Size (MSS), a Round Trip Time (RTT), a Hypertext Transfer Protocol (HTTP) header information, a Real Time Streaming Protocol (RTSP) header information, or a network connection speed.

18. The device according to claim 7, wherein the one or more existing content delivery conditions further comprises, at least one characteristic determined by performing an analysis of at least one of layers 2-7 of the OSI layered protocol of the request.

19. The device according to claim 7, wherein the one or more actions performed by the processor further comprise:
determining the one or more existing content delivery conditions based on an access right associated with a user of the device, a characteristic of the user of the device, or a capability of the device.

20. A method of managing content over a network between a requestor device and at least one requestee device, comprising:
receiving from the requestor device a first request for a resource, wherein the first request includes a Network Resource Identifier (NRI);
determining a plurality of characteristics of the first request that includes at least one characteristic of the requestor device that is determined from an analysis of the first request that enables the requestor to consume the resource;

determining a label associated with the plurality of characteristics of the request;
generating a resource version key by extending the NRI with the label;
executing at least one of a plurality of pre-determined scripts to map a category onto the at least one label based on one or more of the determined characteristics of the first request;
mapping the at least one label having a mapped category to a plurality of content delivery conditions that collapse a plurality of determined characteristics of the first request onto the at least one label and a plurality of resource version keys, wherein the at least one mapped label reduces the number of associations between the resource version keys and the particular versions of the content;
generating a unique key based on the network resource identifier and at least one mapped label, wherein each of the at least one labels is associated with a range of content delivery conditions that are part of a group;
retrieving a version of the resource based on the request, wherein the version of the resource is a modified version based on the plurality of characteristics of the request; and
employing the unique key to cache the version of the resource.

21. The method of claim 20, wherein generating the unique key further comprises applying at least one of hash-coding, semi-random coding, or Cyclic Redundancy Check (CRC) coding to the at least one characteristic and the NRI.

22. The method of claim 20, wherein the request includes Hypertext Transfer Protocol (HTTP) header information or Real Time Streaming Protocol (RTSP) header information.

23. The method of claim 20, further comprising determining the version of the resource to cache, including transcoding the resource into the version of the resource based on the plurality of characteristics of the request.

24. The method of claim 20, wherein retrieving the version of the resource, further comprises:
employing the plurality of characteristics to select one of the requestee device from which to retrieve the resource.

25. The method of claim 20, wherein the label is configured to map a range of the at least one characteristic into a category.

26. The method of claim 20, further comprising:
modifying the retrieved resource based on the plurality of characteristics prior to providing the resource to the requestor device.

27. The method of claim 20, wherein the request comprises:
at least one of a specification of a user agent, an indicator that identifies that the requestor is capable of accepting encoded data, a protocol version, a request method, or an indicator that identifies that the requestor is capable of using a secure protocol.

* * * * *